United States Patent
Suzuki (10) Patent No.: US 10,070,004 B2
(45) Date of Patent: Sep. 4, 2018

(54) COMMUNICATION APPARATUS, METHOD OF CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Katsuya Suzuki, Yashio (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/618,463

(22) Filed: Jun. 9, 2017

(65) Prior Publication Data

US 2018/0007228 A1 Jan. 4, 2018

(30) Foreign Application Priority Data

Jun. 30, 2016 (JP) .................................. 2016-131033

(51) Int. Cl.
*H04N 1/32* (2006.01)
*H04W 4/06* (2009.01)
(Continued)

(52) U.S. Cl.
CPC ..... *H04N 1/32662* (2013.01); *H04N 1/00307* (2013.01); *H04N 1/00315* (2013.01);
(Continued)

(58) Field of Classification Search
CPC ........... H04N 1/32662; H04N 1/00315; H04N 1/32625; H04N 1/00307; H04N 2201/0055; H04N 2201/0094; H04N 2201/3278; H04N 2201/3284; H04W 4/06; H04W 4/008; H04W 4/80
(Continued)

(56) References Cited

U.S. PATENT DOCUMENTS

2007/0149124 A1* 6/2007 Onozawa ............. H04B 5/0062
455/41.2
2013/0329253 A1* 12/2013 Sasaki .................. H04N 1/0035
358/1.15

(Continued)

FOREIGN PATENT DOCUMENTS

JP H11-265270 A 9/1999

*Primary Examiner* — Allen H Nguyen
(74) *Attorney, Agent, or Firm* — Fitzpatrick, Cella, Harper & Scinto (57) ABSTRACT

A communication apparatus capable of wireless communication with an external apparatus includes at least one processor, and at least one memory storing a program which is executed by the at least one processor to cause the communication apparatus to broadcast an advertisement signal prior to establishing a connection by wireless communication with the external apparatus, set an output radio wave intensity for which an advertisement signal is broadcast for a type of error which occurs in the communication apparatus, and determine a type of error that occurred in the communication apparatus. When an error occurs in the communication apparatus, the type of error that occurred is determined and an advertisement signal that includes information indicating that the error occurred is broadcasted at an output radio wave intensity set for the type of error.

12 Claims, 11 Drawing Sheets

(51) Int. Cl.
*H04W 4/00* (2018.01)
*H04N 1/00* (2006.01)
*H04W 4/80* (2018.01)

(52) U.S. Cl.
CPC .......... *H04N 1/32625* (2013.01); *H04W 4/06* (2013.01); *H04W 4/80* (2018.02); *H04N 2201/0055* (2013.01); *H04N 2201/0094* (2013.01); *H04N 2201/3278* (2013.01); *H04N 2201/3284* (2013.01)

(58) Field of Classification Search
USPC ....................................................... 358/1.14
See application file for complete search history.

(56) References Cited

U.S. PATENT DOCUMENTS

2016/0241728 A1* 8/2016 Naruse ............... H04N 1/00347
2017/0013153 A1* 1/2017 Shin .................... H04N 1/00891
2017/0134609 A1* 5/2017 Park ................... H04N 1/32776

\* cited by examiner

| NOTIFICATION DISTANCE | RADIO WAVE TRANSMISSION OUTPUT |
|---|---|
| Near (ABOUT 1-2M) | Weak (ABOUT DOZENS μW) |
| Far (ABOUT 20-50M) | Strong (ABOUT DOZENS mW) |

FIG. 8

| ERROR THAT CAUSES OPERATION OF APPARATUS TO STOP | ERROR THAT DOES NOT CAUSE OPERATION OF APPARATUS TO STOP |
|---|---|
| PAPER JAM ERROR<br><br>NO INK ERROR<br><br>NO PAPER ERROR<br><br>ETC. | JOB ERROR<br><br>REMAINING INK IS LOW ERROR (WARNING)<br><br>REMAINING PAPER IS LOW ERROR (WARNING)<br><br>ETC. |

ERROR NOTIFICATION SETTING SCREEN

| ERROR TYPE | DISTANCE |
|---|---|
| A (CAUSES STOPPAGE) | Far |
| B (DOES NOT CAUSE STOPPAGE) | Near |

CHANGE

FIG. 10

COMMUNICATION APPARATUS, METHOD OF CONTROLLING THE SAME, AND NON-TRANSITORY COMPUTER-READABLE STORAGE MEDIUM

BACKGROUND OF THE INVENTION

Field of the Invention

The present invention relates to a communication apparatus, a method of controlling the same, and a non-transitory computer-readable storage medium.

Description of the Related Art

When an error occurs in an image forming apparatus, it will take time for the error to be noticed when there is no user in the proximity of the apparatus. In such a case, a resolution of the error will be delayed and a job of the apparatus will be stopped for a long time. Accordingly, Japanese Patent Laid-Open No. H11-265270 proposes a technique in which, immediately prior to print sheets running out, something to that effect is notified to a wireless terminal of an operator.

When an error occurs in the image forming apparatus, when something to that effect is notified only to an identified mobile terminal, time is required for apparatus recovery in a case when the apparatus is in a state in which a user who received the notification cannot resolve the error. On the other hand, making an error notification every time to a large number of unidentified mobile terminals causes irritation when users not associated with the apparatus are notified.

SUMMARY OF THE INVENTION

The present invention, in view of the foregoing problem, makes it possible to control a notification range in accordance with error content and perform an error notification in an appropriate range.

According to one aspect of the present invention, there is provided a communication apparatus capable of wireless communication with an external apparatus, the communication apparatus comprising: a broadcast unit configured to broadcast an advertisement signal prior to establishing a connection by wireless communication with the external apparatus; and a determination unit configured to determine a type of error that occurred in the communication apparatus, wherein when an error occurs in the communication apparatus, the determination unit determines the type of the error that occurred in the communication apparatus and the broadcast unit broadcasts, at an output radio wave intensity set for the type of the error, an advertisement signal that includes information indicating that the error occurred.

According to another aspect of the present invention, there is provided a method of controlling a communication apparatus capable of wireless communication with an external apparatus, the method comprising: broadcasting an advertisement signal prior to establishing a connection by wireless communication with the external apparatus; and determining a type of error that occurred in the communication apparatus, wherein when an error occurs in the communication apparatus, the type of the error that occurred in the communication apparatus is determined and an advertisement signal that includes information indicating that the error occurred is broadcasted at an output radio wave intensity set for the type of the error.

According to another aspect of the present invention, there is provided a non-transitory computer-readable storage medium storing a program that causes a computer to broadcast an advertisement signal prior to establishing a connection by wireless communication with an external apparatus; and determine a type of error that occurred in the computer, wherein when an error occurs in the computer, the type of the error that occurred in the computer is determined and an advertisement signal that includes information indicating that the error occurred is broadcasted at an output radio wave intensity set for the type of the error.

By the present invention, it is possible to control a notification range depending on error contents and perform an error notification appropriately within that range.

Further features of the present invention will become apparent from the following description of exemplary embodiments (with reference to the attached drawings).

DESCRIPTION OF THE EMBODIMENTS

Explanation is given below in detail, with reference to the drawings, of a preferred embodiment of the present invention as an example. However, the contents and relative arrangements of the configuration elements, and the like, that are recited in the present embodiment are not intended to limit the scope of the invention thereto, unless specifically stated. Also, although in the present embodiment description is given of an example of an image forming apparatus as an apparatus in which an error can occur, limitation is not made to this, and the invention may be applied to another information processing apparatus.

System Configuration

Figure 1:
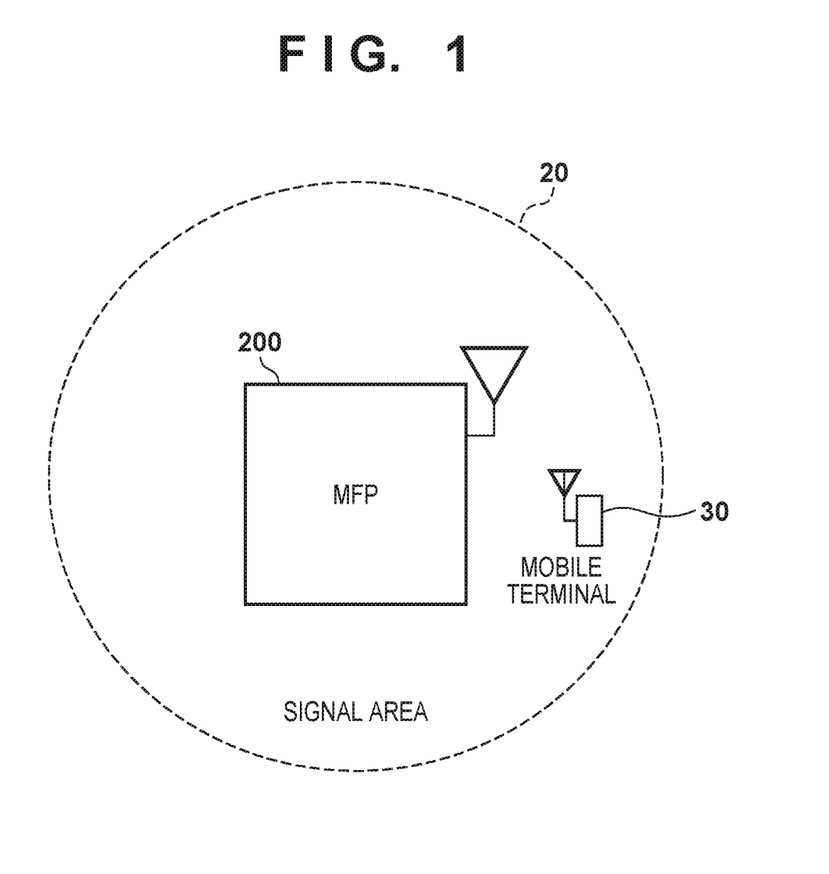
FIG. 1 is a schematic diagram illustrating an example of a configuration of a system according to an embodiment of the present application invention.

FIG. 1 is a schematic diagram illustrating an image forming apparatus and the surrounding environment thereof to which the present embodiment is applied. An MFP 200 is an image forming apparatus to which the present application invention can be applied, and is a multi-function printer (abbreviated as MFP hereinafter) which has functions such as print, scan, copy and fax. The MFP 200 can operate as a BLE (Bluetooth Low Energy) peripheral (peripheral device). That is, the MFP 200 sends an advertisement signal (an Advertising Packet) to the surroundings without performing a network connection with an identified terminal. In the present embodiment, a mobile terminal 30 is used as a central (a central device) which is a BLE central node. The mobile terminal 30 may use any apparatus as long as it is a terminal that can perform a BLE communication such as a portable phone, a digital camera, a smartphone, or the like. The MFP 200, based on a predetermined condition, transmits an advertisement signal in a fixed range (a signal area 20), and the mobile terminal 30 can receive the advertisement packet from the MFP 200 if positioned within the signal area 20. Here, a range of the signal area 20 and a transmitting interval of the advertisement signal are described later.

Figure 2A:
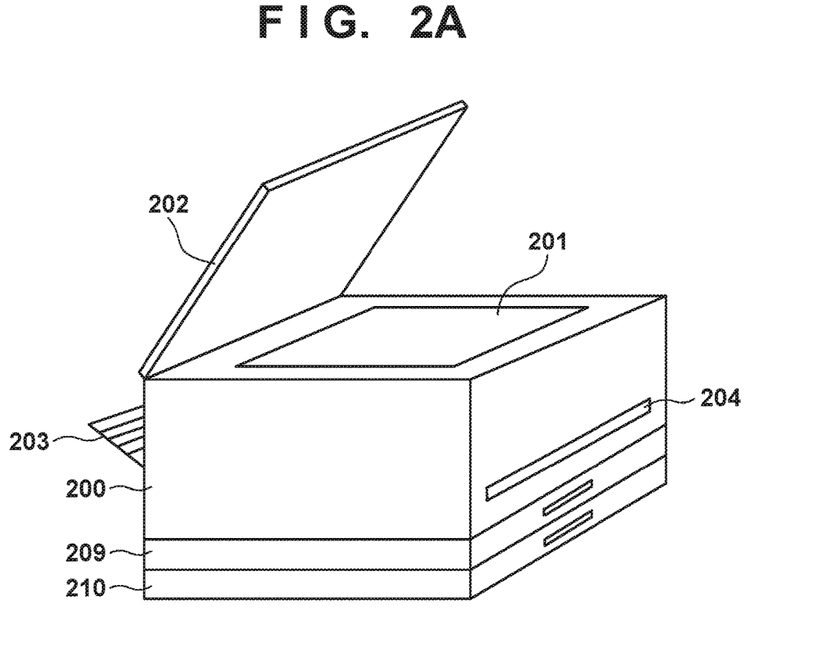
FIGS. 2A and 2B are figures illustrating an example of an outer appearance of an MFP according to an embodiment of the present application invention.
Figure 2B:
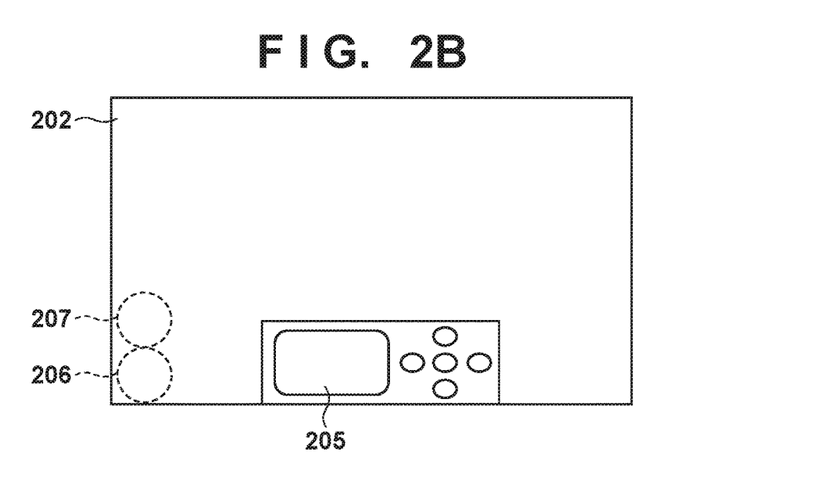

FIGS. 2A and 2B are figures illustrating an example of an outer appearance of the MFP 200 according to the present embodiment. Configuration may be taken such that the MFP 200 prints by an ink-jet method, or configuration may be taken such that the MFP 200 prints by another recording method. An original platen 201 is a transparent glass base, and is used when an original is placed on it and read by the scanner. An original lid 202 is a lid for making it so that scanning light does not leak to the outside when performing reading by the scanner. An insertion port 203 is an insertion port for setting print media such as papers of various sizes. The print media set in here is conveyed to a print unit (not shown) one at a time, a desired print is performed on it, and it is discharged from a discharging port 204. The MFP 200, as other print media supply units, comprises cassettes 209 and 210. For example, by setting A3 sheets in the cassette 209, and setting A4 sheets in the cassette 210, a user can execute jobs whose sheet sizes are A3 and A4 without going to the side of the MFP 200 and changing the print media. Note that, the number of the cassettes is not limited to two, and more cassettes may be comprised, or there may be a single cassette. An operation display unit 205 is arranged on an upper part of the original lid 202. The operation display unit 205 comprises a display screen for displaying an image, an operation menu, or the like, arrow keys for using a cursor movement or the like on the display screen, and keys for executing other various functions. A WLAN antenna 206 illustrates an antenna for communicating by a wireless LAN. Note that, no particular limitation is made for a communication specification in the wireless LAN. A BT antenna 207 illustrates an antenna for communicating by Bluetooth (registered trademark) and BLE, which are kinds of short-range wireless communication.

Figure 3A:
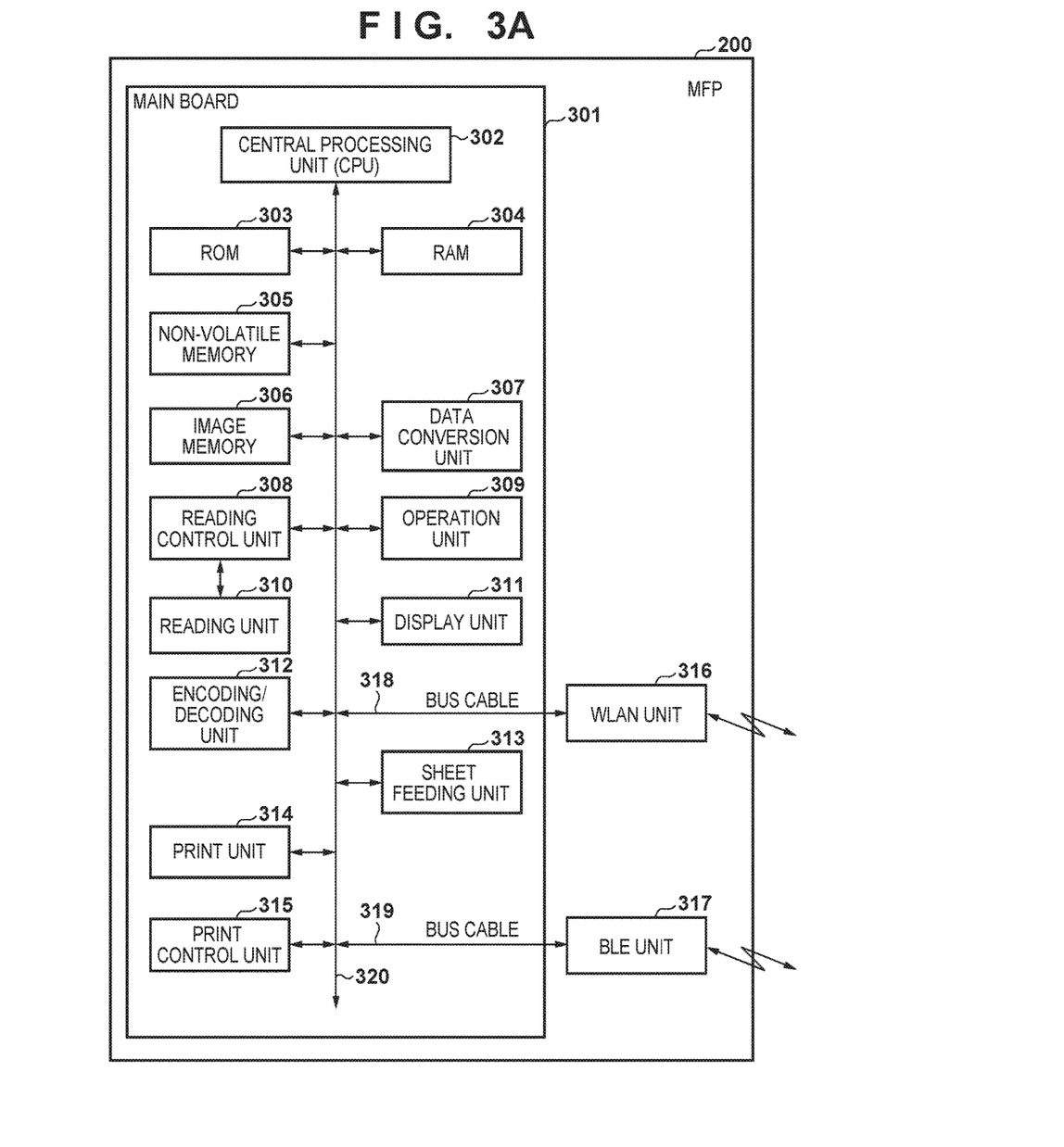
FIG. 3A is a figure illustrating an example of a hardware configuration of the MFP according to an embodiment of the present application invention.

FIG. 3A is a figure illustrating an example of a hardware configuration of the MFP 200 according to the present embodiment. The MFP 200 is configured to include a main board 301 for performing main control of the apparatus, a WLAN unit 316 for performing WLAN communication, and a BLE unit 317 for performing Bluetooth (registered trademark) and BLE communication. In the main board 301, a CPU 302 is a system control unit, and controls the MFP 200 on the whole. A ROM 303 is a non-volatile storage region, and stores an embedded operating system (OS) program, a control program, or the like which the CPU 302 executes. In the present embodiment, each control program stored in the ROM 303 performs software control such as scheduling or task switching under the management of the embedded OS stored in the ROM 303.

A RAM 304 is configured from an SRAM (static RAM), and various work buffer regions are arranged. For example, the RAM 304 stores variables and the like for the control of programs, setting values that the user has registered, and management data and the like of the MFP 200. A non-volatile memory 305 is configured from a flash memory, and stores data to be held when the power supply is off. Specifically, user data such as a FAX telephone number, a communication history, and network information, a list of mobile terminals that connected in the past, setting information of the MFP 200 such as a menu item such as a print mode and print head correction information, and the like are stored in the non-volatile memory 305. An image memory 306 is configured from a DRAM (dynamic RAM) and accumulates image data received via each communication unit and image data processed by an encoding/decoding unit 312. Note that, the memory configuration is not limited to the description above, and configuration may be taken such that it is connected to the MFP 200 as an external apparatus for example.

A data conversion unit 307 performs an analysis of a page description language (PDL) and the like, and a conversion from image data to print data. A reading control unit 308 controls a reading of an original by a reading unit 310. The reading unit 310 optically reads, by a CIS image sensor (the contact image sensor), an original placed on the original platen 201. The image signal read by the CIS image sensor and converted to electrical image data is output as high definition image data via an image processing control unit (not shown) in accordance with various image processes such as binarization processing or halftone processing being applied. This image data is held in the image memory 306.

An operation unit 309 and a display unit 311 correspond to the operation display unit 205 described in FIG. 2B. Specifically, for the operation display unit 205, at least a part of the operation unit 309 and the display unit 311 are integrated. The encoding/decoding unit 312 performs encoding/decoding processing or resizing processing on the image data (JPEG, PNG, or the like) handled in the MFP 200. A sheet feeding unit 313 holds print media for printing, and feeds the print media at the time of print processing. Specifically, the sheet feeding unit 313 corresponds to the insertion port 203 and the cassettes 209 and 210 described in FIG. 2A. A feed is performed from the sheet feeding unit 313 by controlling from a print control unit 315. The print control unit 315, in the print processing, controls which part in the sheet feeding unit 313 performs the feeding. The print control unit 315 applies various image processing such as smoothing processing, print density correction processing, or color correction to image data to be printed, via the image processing control unit (not shown), converts it to high definition image data, and outputs it to a print unit 314. Also, the print control unit 315 reads information of the print unit 314 periodically, and updates information of the RAM 304. Specifically, the print control unit 315 updates remaining amounts of ink tanks and a status of a printhead and the like.

Two means for wireless communication are mounted to the MFP 200 according to the present embodiment and these can perform wireless communication by WLAN and BLE. When Bluetooth (registered trademark) and BLE communication is performed, the BLE unit 317 is used for both. The WLAN unit 316 and the BLE unit 317, configured in accordance with respective communication specifications, are communication units that perform data communication with other devices such as the mobile terminal 30. The WLAN unit 316 and the BLE unit 317 convert data to packets and perform a packet transmission to an external device (for example, the mobile terminal 30), in accordance with the respective communication specifications. Also, the WLAN unit 316 and the BLE unit 317 convert packets from an external device to data and send it to the CPU 302. The WLAN antenna 206 illustrated in FIG. 2B is included in the WLAN unit 316, and the BT antenna 207 is included in the BLE unit 317. The WLAN unit 316 and the BLE unit 317 are connected to the main board 301 via bus cables 318 and 319. Also, the above configuration elements 302 to 315 included in the main board 301 are connected communicatively via a system bus 320.

Figure 3B:
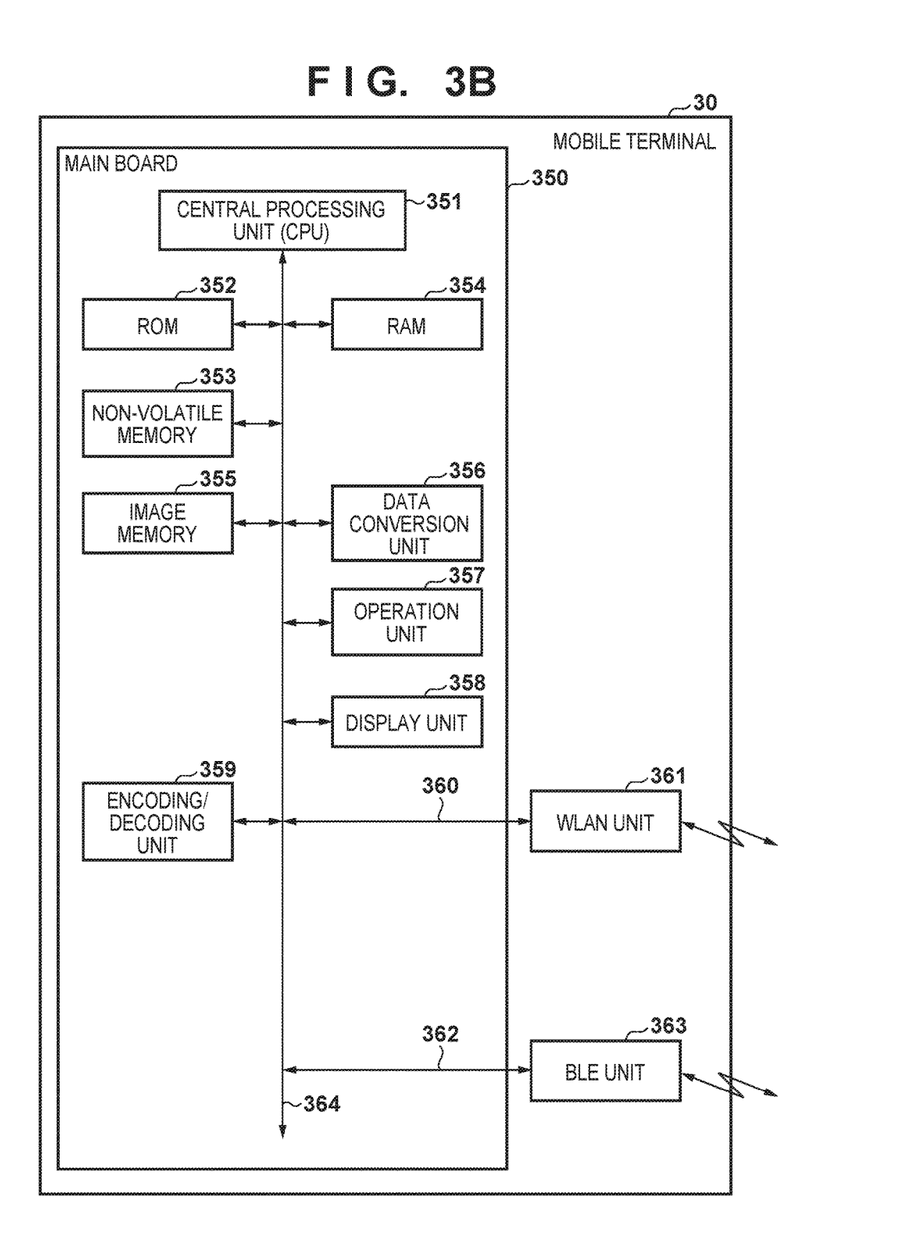
FIG. 3B is a figure illustrating an example of a hardware configuration of a mobile terminal according to an embodiment of the present application invention.

FIG. 3B is a figure illustrating an example of a hardware configuration of the mobile terminal 30 according to the present embodiment. The mobile terminal 30 is configured to include a main board 350 for performing main control of the apparatus, a WLAN unit 361 for performing WLAN communication, and a BLE unit 363 for performing Bluetooth communication and BLE communication.

In the main board 350, a CPU 351 is a system control unit, and controls the mobile terminal 30 on the whole. A ROM 352 stores various programs such as an embedded operating system (OS) program, a control program, or the like which the CPU 351 executes. In the present embodiment, each control program stored in the ROM 352 performs software control such as scheduling or task switching under the management of the embedded OS stored in the ROM 352. A RAM 354 is configured from a memory such as an SRAM (static RAM), stores various data such as program control variables, setting values registered by a user, and management data of the mobile terminal 30, and is where various work buffer regions are arranged.

A non-volatile memory 353 is configured from memory such as a flash memory, and stores data to be held when the power supply is off. Specifically, this data includes a communication history, user data such as network information, a list of MFPs connected to in the past, and setting information of the mobile terminal 30 such as menu items of a communication mode or the like. An image memory 355 is configured from a memory such as a DRAM (dynamic RAM) and stores various data such as image data received via each communication unit and image data processed by an encoding/decoding unit 359. Note, the memory configurations of the above described various memories are not limited to this, and it is possible to appropriately configure the number, the characteristics, and the storage capacities thereof in accordance with the usage or objective.

A data conversion unit 356 performs processing such as data analysis and conversion from image data to job data. An operation unit 357 comprises a touch panel, keys, buttons, and the like for performing operations in relation to the mobile terminal 30. A display unit 358 is configured from an LCD, for example. The encoding/decoding unit 359 performs various processes such as encoding/decoding processing or resizing processing on the image data (JPEG, PNG, or the like) that is processed in the mobile terminal 30.

The mobile terminal 30, as a communication unit for performing wireless communication, has the WLAN unit 361 and the BLE unit 363, and can perform wireless communication by WLAN and BLE communication specifications. Specifically, the WLAN unit 361 and the BLE unit 363 are units for realizing communication that conforms to the WLAN and BLE standards respectively. The BLE unit 363 is a unit used for both classic Bluetooth (registered trademark) and BLE. The WLAN unit 361 and the BLE unit 363 are communication units for performing data communication with other devices such as the MFP. These communication units convert data into packets and perform packet transmission to other devices. Meanwhile, these communication units convert the packets from another external device into data, and send it to the CPU 351.

The WLAN unit 361 and the BLE unit 363 are connected to a system bus 364 respectively via bus cables 360 and 362. Note that, the various configuration elements 351 to 359 described above are connected to each other via the system bus 364 which the CPU 351 manages.

Figure 4:
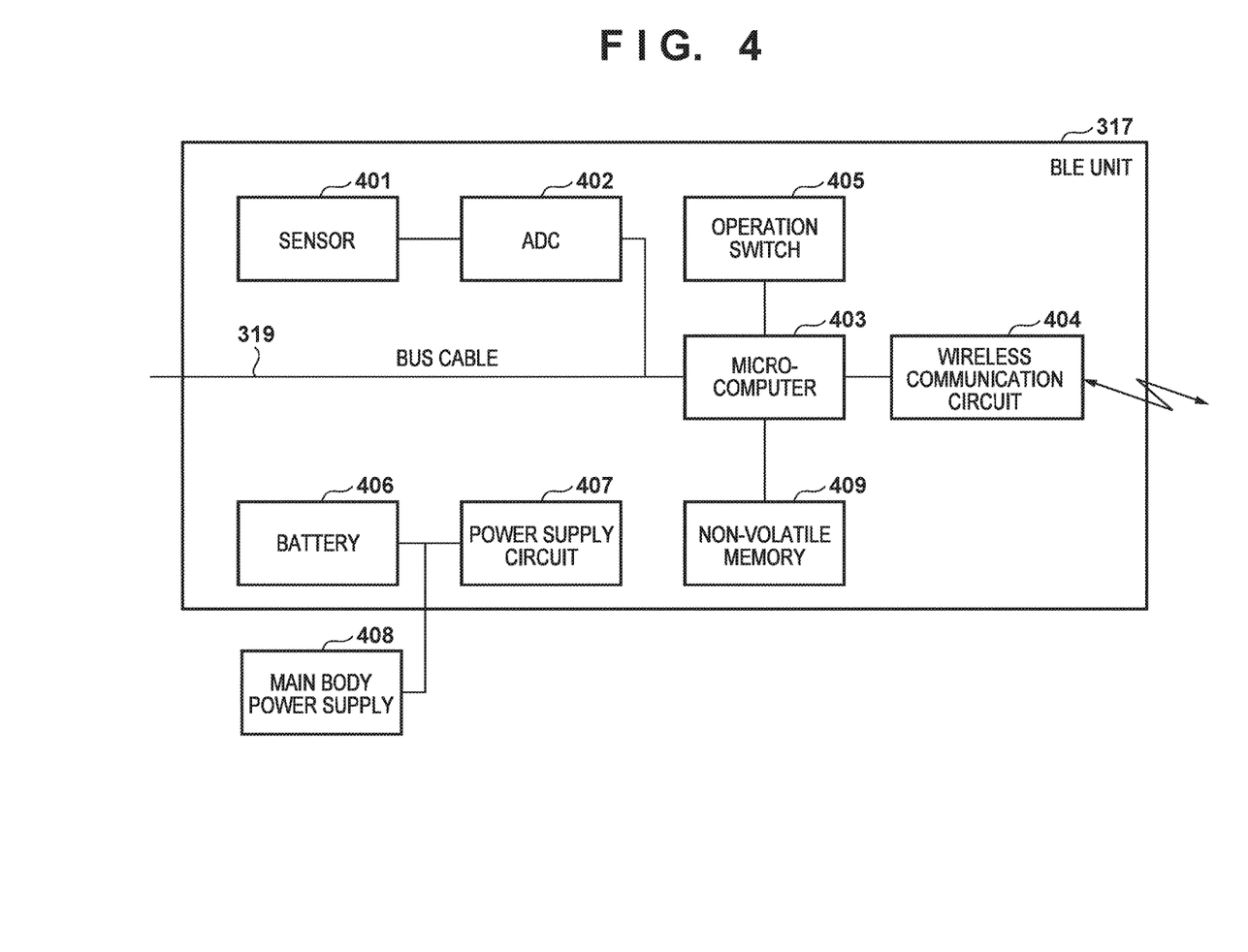
FIG. 4 is a view illustrating an example of a hardware configuration of a BLE unit according to an embodiment of the present application invention.

FIG. 4 is a view illustrating an example of a hardware configuration of the BLE unit 317 that the MFP 200 comprises and the BLE unit 363. Hereinafter, description is be given with the BLE unit 317 as an example. The BLE unit 317 includes and is configured by a sensor 401, an ADC (Analog-to-Digital Converter) 402, a microcomputer 403, a wireless communication circuit 404, an operation switch 405, a battery 406, a power supply circuit 407, and a non-volatile memory 409. The data desired to be communicated is sent/received between the main board 301 and the microcomputer 403 via the bus cable 319. Here, information of an error that occurred within the MFP 200, information of a state of the print unit 314 or the sheet feeding unit 313, and the like are given as an example of the data. Note, not only the BLE unit 317 can send/receive data from the bus cable 319, it can send/receive data by a control separate from control from the main board 301 by attachment of an independent sensor. The sensor 401 is a device that changes a physical amount of a sensing target into an electrical signal. The sensor 401 may be a monitoring sensor or a motion sensor for identifying a person in front of the MFP 200, a temperature sensor for monitoring a temperature of the MFP 200, or the like, for example. The ADC 402 is an analog/digital conversion circuit and converts an analog signal obtained from the sensor 401 into a digital signal that the microcomputer 403 can process.

The microcomputer 403 is a microprocessor that performs processing relating to wireless communication by Bluetooth (registered trademark) and BLE. The microcomputer 403 performs processing according to the present embodiment described later. A RAM and a flash memory (not shown) are mounted to the microcomputer 403. The wireless communication circuit 404 is configured by a wireless communication chip, a quartz oscillator, an inductance, a capacitor, and the like, and performs reception and sending of wireless communications. The wireless communication circuit 404 includes the BT antenna 207 of FIG. 2B. The operation switch 405 is a switch for turning on and off the power of the BLE unit 317 in a standby state. The battery 406 is a button battery or the like. A main body power supply 408 is a power supply supplied from the main board 301. The power supply circuit 407 is a circuit that performs a voltage adjustment and the like for more efficiently supplying power from the battery 406 or the main body power supply 408. The BLE unit 317, by equipping two systems of power supply, can broadcast an advertisement signal in a case when the MFP 200 cannot activate for some reason and in a case when the main body side reduces the power supply of the main board 301 as a power saving state. Also, on the BLE unit 317 the non-volatile memory 409 is mounted, and by holding information from the main board 301, the BLE unit 317 can communicate with an external apparatus alone. Note, the configuration of the BLE unit 317 illustrated in FIG. 4 is only one example and it may be equipped with other configuration elements. Also, although a configuration in which the BLE unit 317 is integrated in the MFP 200 is illustrated in the present embodiment, limitation is not made to this, and a configuration may be taken in which it is externally attached.

Figure 5:
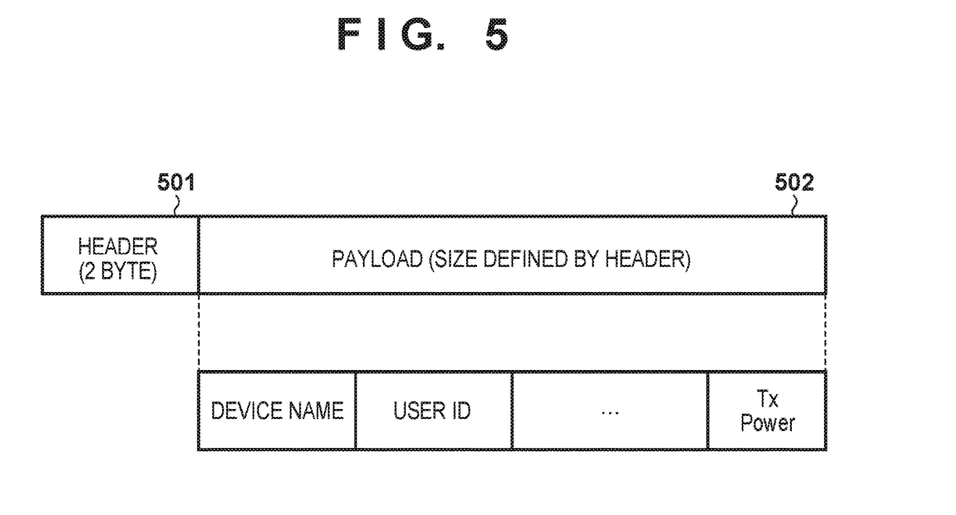
FIG. 5 is a figure illustrating an example of a configuration of an Advertising Packet.

FIG. 5 is one example of a structure of an Advertising Packet that the BLE unit 317 broadcasts to the periphery (the signal area 20). The BLE unit 317 performs initialization processing and enters a standby state when powered on. The BLE unit 317 continuously maintains the standby state while the MFP 200 operates normally. The BLE unit 317 immediately transitions to an advertising state when the MFP 200 detects an error. The BLE unit 317 periodically sends an Advertising Packet at an interval that can be set and thereby notifies an error state of the MFP 200 to the periphery when the advertising state is entered. Here, the intervals are assumed to be set in advance.

The Advertising Packet is configured from a two-byte header 501 and a payload 502. The header 501 is a region for storing information of a type of the Advertising Packet, a size of the payload 502, and the like. The payload 502, in addition to the information of a profile and a device name of the MFP 200, can store a transmission power (Tx Power) and the like. Note, although the configuration of the profile of the MFP 200 is defined by the manufacturer of the MFP 200 or the like, a detailed description is omitted here because it is not limited in the present embodiment.

Figure 10:
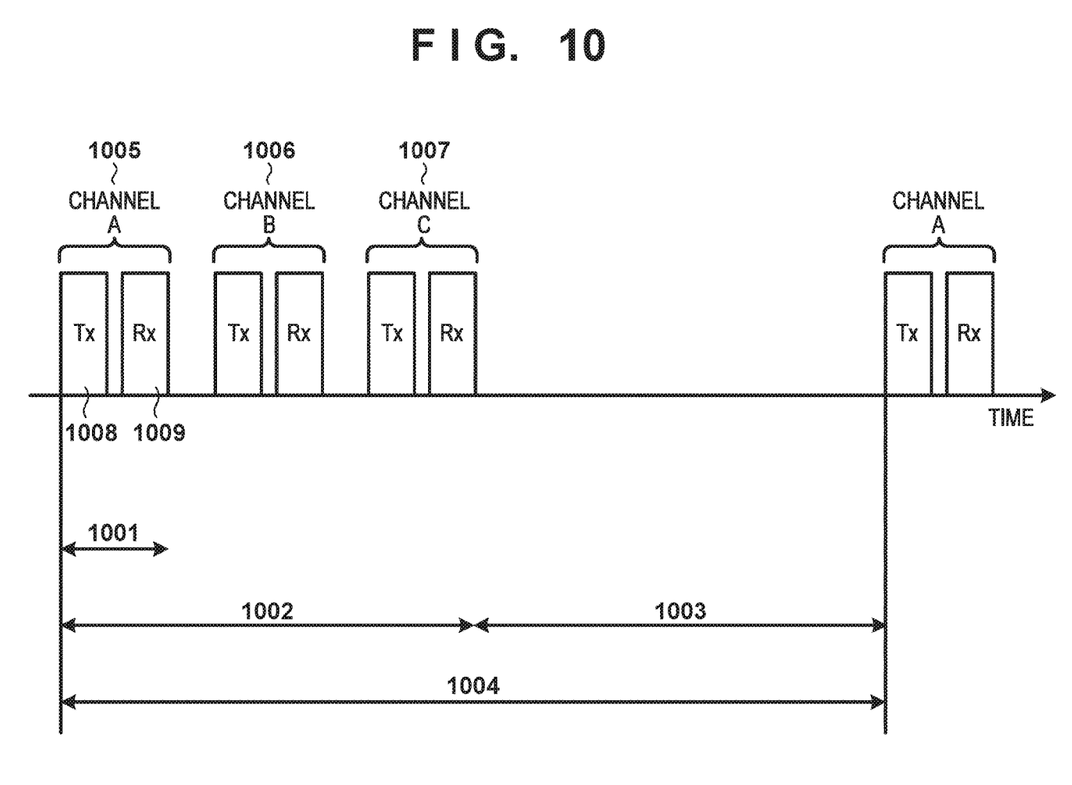
FIG. 10 is a view illustrating a broadcast timing of an advertisement packet.

FIG. 10 is a view illustrating an advertisement signal that the BLE unit 317 broadcasts to the periphery.

FIG. 10 illustrates a normal advertisement signal that the MFP 200 outputs. Tx 1008 indicates a transmission section of the advertisement signal in which predetermined packets (advertisement packets) are sent by causing the transmission circuit to operate. Rx 1009 indicates a standby section in which a response from a communication partner (the mobile terminal 30 for example) to the advertisement signal is awaited. Specifically, the MFP 200 switches to a state in which the response from the communication partner can be received by turning ON the power supply of the reception circuit in Rx 1009. Also, it switches to a state in which a response cannot be received by the power supply of the reception circuit turning OFF after a predetermined time elapses, specifically, outside of the standby section of Rx 1009. Tx 1008 and Rx 1009 are performed in one channel A 1005 and an advertising time 1001 is defined by Tx 1008 and Rx 1009 in the channel A 1005. Following the channel A 1005, a channel B 1006 and a channel C 1007 are configured with the same configuration. Also, Tx and Rx are repeated by the number of determined channels. For example, channels 37, 38, and 39 are assigned to advertisement packet channels in the BLE standard, and the channel A 1005, the channel B 1006, and the channel C 1007 correspond to these channels in the present embodiment.

An Active section 1002 is a section in which sending/receiving by Tx and Rx is performed. A power-saving section 1003 is a section in which sending/receiving by Tx and Rx is not performed. The longer the power-saving section 1003 is, the more the power consumption of the BLE unit 317 can be suppressed. In this way, a predetermined interval from broadcasting the advertisement signal until broadcasting the next advertisement signal after waiting for a response corresponding to the advertisement signal for a predetermined time (Active section 1002) is called an advertising interval 1004.

Figure 6:
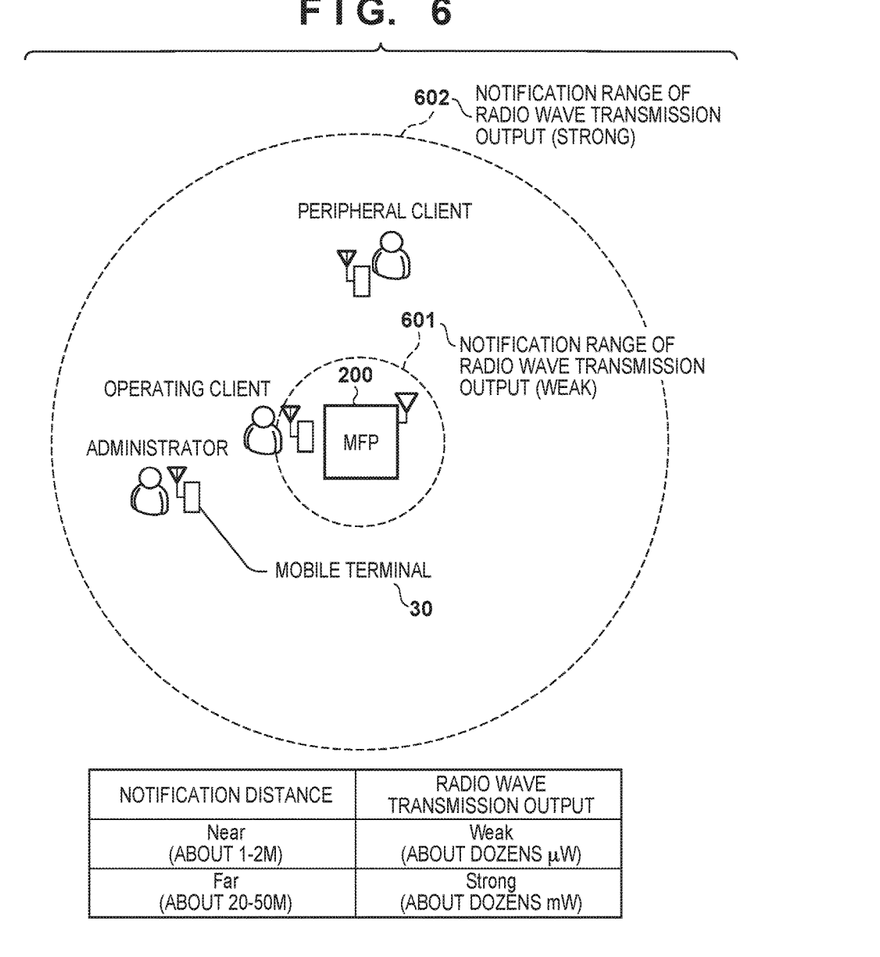
FIG. 6 is a view illustrating an example of ranges over which to notify an error.

FIG. 6 is a view illustrating an example of ranges over which the MFP 200 uses the Advertising Packet to broadcast and make a notification of an error to the periphery. In the present embodiment, the BLE unit 317 can operate by switching the range that the Advertising Packet can reach. The range over which an error is notified becomes smaller if the radio wave transmission output (output radio wave intensity) of the BLE unit 317 is set to be weaker (601). The range over which an error is notified becomes larger if the radio wave transmission output (output radio wave intensity) is set to be stronger (602). In the present embodiment, a large number of unidentified clients to which a notification of an error is desired are designated according to distance and it is possible to notify errors to them appropriately by switching the radio wave transmission output. In other words, it is restricted which clients receive a notification by switching to control the range over which notification is possible in accordance with the type of the error in the present embodiment. Note, an intelligent configuration, in which a network of an MFP and clients (mobile terminals) is managed, is unnecessary in cases such as when a notification is made to an identified client in this configuration.

In FIG. 6, clients are classified into three groups: clients operating the MFP 200; clients in the periphery; and administrators. In the present embodiment, an error is notified to each appropriate destination (client) according to the type of error that occurred by switching the notification range. In FIG. 6, the client operating the MFP 200 is positioned within the notification range (Near) of the radio wave transmission output (Weak). Also, although the client in the periphery and the administrator are outside of the notification range (Near) of the radio wave transmission output (Weak), they are positioned inside of the notification range (Far) of the radio wave transmission output (Strong). Note, although two types of notification ranges for the radio wave transmission output (Near and Far) are defined in the present embodiment, limitation is not made to this and more notification ranges may be defined. However, the radio wave transmission output and the notification distance corresponding to each notification range depend on the specification of the BLE unit 317.

Processing Flow

Figure 7:
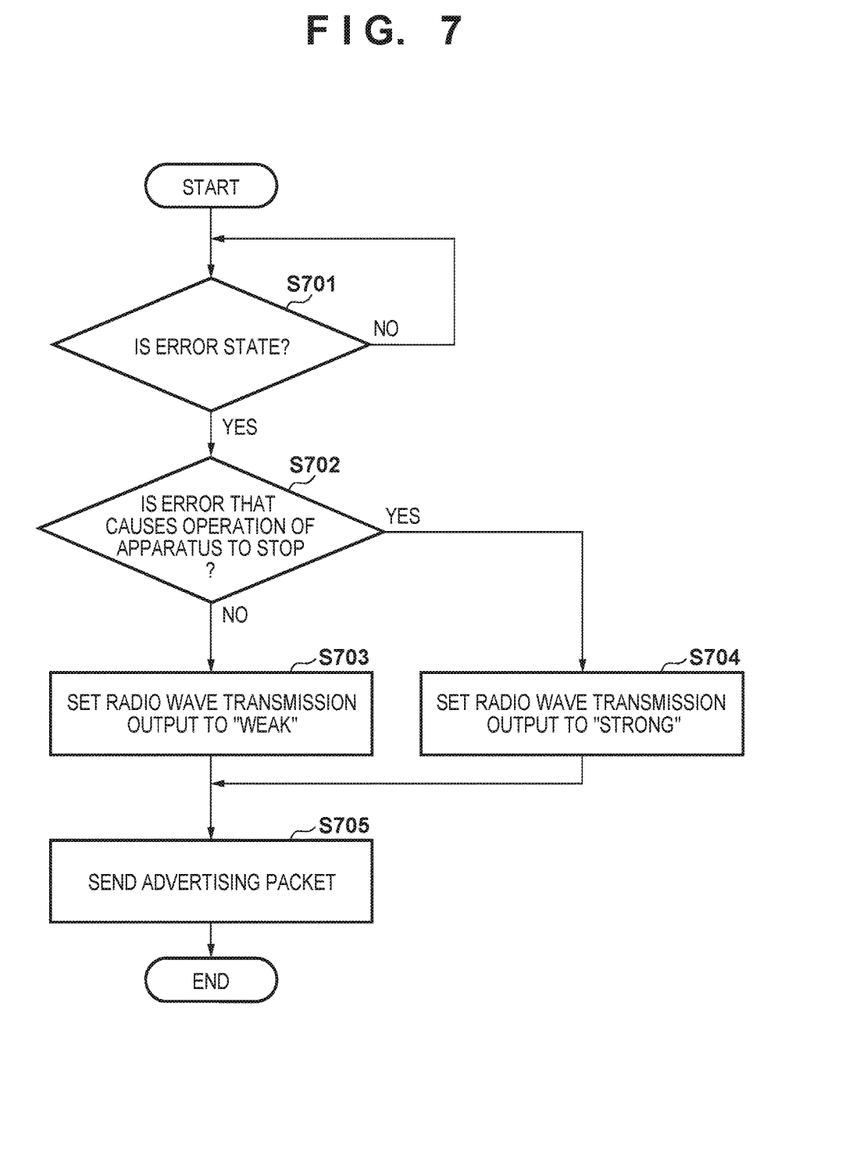
FIG. 7 is a flowchart illustrating an example of a processing sequence according to an embodiment of the present application invention.

FIG. 7 illustrates a flowchart of processing according to the present embodiment. The microcomputer 403 that the BLE unit 317 is equipped with performs this processing flow. This processing flow may be started by the power supply of the MFP 200 being turned on or configuration may be taken so as to start the processing periodically on the BLE unit 317 side for example.

In step S701, the microcomputer 403 determines whether or not the apparatus is in an error state. Here, the determination of the error state may be determined by verifying a status of each part that the MFP 200 is equipped with or may be determined in accordance with a notification from the CPU 302, for example. When not in an error state (NO in step S701), a standby state continues until an error occurs. Note, the processing may finish in a case when it is not an error state (NO in step S701). Step S702 is advanced to in a case of an error state (YES in step S701).

In step S702, the microcomputer 403 determines whether or not the error that occurred is something that caused the operation of the apparatus to stop. Step S703 is advanced to in a case when it is an error which did not cause the operation of the apparatus to stop (NO in step S702) and step S704 is advanced to in a case when it is an error which did cause the operation of the apparatus to stop (YES in step S702). Description is given later of an example of errors using FIG. 8.

In a case of an error that does not cause the operation of the apparatus to stop, it is sufficient that something to that effect be notified to the client currently operating the MFP 200, and so the microcomputer 403 sets the radio wave transmission output of the BLE unit 317 (the wireless communication circuit 404) to Weak in step S703. Then step S705 is advanced to.

In a case of an error that causes the operation of the apparatus to stop, it is preferable that something to that effect is conveyed to the surroundings or the administrator immediately, in an effort to restore the apparatus. Accordingly, the microcomputer 403 sets the radio wave transmission output of the BLE unit 317 (wireless communication circuit 404) to Strong in step S704 in order to broadcast a notification over the wider range. Then step S705 is advanced to.

In step S705, the wireless communication circuit 404 sends an Advertising Packet. At that time, it is assumed that the Advertising Packet (advertisement signal) that the wireless communication circuit 404 outputs includes information indicating that an error occurred. For information indicating that an error occurred, it may be information in which the type of error can be identified or may be information that merely indicates that an error occurred (something that sets an error flag for example). The information that can identify the type of error may be information that can identify the contents of the error itself, or may be a classification of the error (such as whether or not it is an error that causes operation of an apparatus to stop or an error resolution level). Bits may be assigned to each type of error for example, in a case when an advertisement signal including information by which the type of error can be identified is sent. By receiving an advertisement signal which includes information indicating that an error occurred, the mobile terminal 30 can make a notification to the user by identifying that the error occurred in the MFP without establishing a connection with the MFP 200.

Note, the sending here may be performed a predetermined number of times at a predetermined transmission interval in accordance with a condition set in advance for example. Also, configuration may be taken so as to, in a case such as when an error is not cancelled even if a predetermined time has elapsed after sending a predetermined number of times, shorten the transmission interval or to widen the notification range and then perform a resend. Then, this processing flow is then finished.

Figure 8:
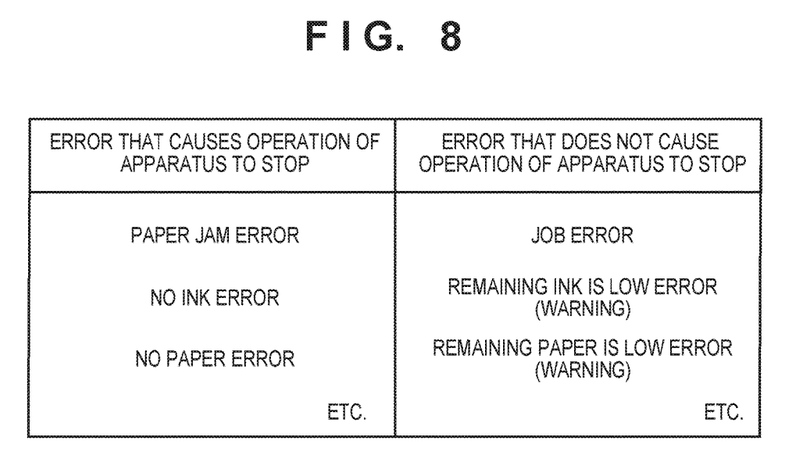
FIG. 8 is a figure illustrating an example of an error classification according to an embodiment of the present application invention.

FIG. 8 illustrates one example of an error that occurred in the MFP 200. Here, errors that cause operation of the apparatus to stop and errors that do not cause operation of the apparatus to stop are classified. The former is a case when operation of the apparatus body stops triggered by an error such as a paper jam or a case when the apparatus stops due to a shortage of a replenishable consumable such as where there is no ink or no paper; the latter corresponds to a job error associated with a job rather than the apparatus body such as when a command of an inputted job is incorrect or when job data is incorrect, or corresponds to a warning type error such as when there is a low remaining amount of a consumable, such as a low remaining amount of ink or a low remaining amount of paper. The determination of step S702 is performed in accordance with this classification. Information relating to error classification is held in the non-volatile memory 409 that the BLE unit is equipped with for example. Also, the radio wave transmission output (radio wave intensity) is set in advance for each error classification and is held in the non-volatile memory 409. Note, configuration may be taken such that, as described using FIG. 9, the radio wave transmission output (radio wave intensity) for each classification of error can be set by the user and configuration may be taken such that what is set can be changed. By classifying errors in this way, it is possible to prevent notifying a job type error or a warning type error to a client who is not associated with the operation of the apparatus, and it is possible to facilitate an early recovery of the apparatus at a time of a stoppage of the apparatus by notifying something to that effect to as many unidentified clients as possible.

Note, the classification of an error is not limited to what is illustrated in FIG. 8 and may be a classification according to an error resolution level. For example, three errors may be classified: a warning error, a stop error, and a trouble error, and the notification ranges may be sorted in accordance with the degree of importance or urgency. The warning error is an error that does not cause the operation of the apparatus illustrated in FIG. 8 to stop. The stop error, among errors that cause the operation of the apparatus to stop, is an error not due to trouble. A trouble error, among errors that cause the operation of the apparatus to stop, is an error that is due to trouble. For example, a notification is made only to an operating client in the cases of the warning error and the stop error, and a notification is made to an administrator and the periphery only in the case of the trouble error. By this, a notification frequency and range can be set appropriately according to the use environment. In other words, an index (classification) of a degree of importance is set for each error and a notification range is set in accordance with the classification.

Also, the errors indicated above are only one example of errors where an image forming apparatus is envisioned, and in a case when the present application invention is applied to an apparatus corresponding to another function, errors may be classified in accordance with the function that the apparatus has, for example. Accordingly, the determination of step S702 of FIG. 7 is performed in accordance with the classification of the errors that was set.

Figure 9:
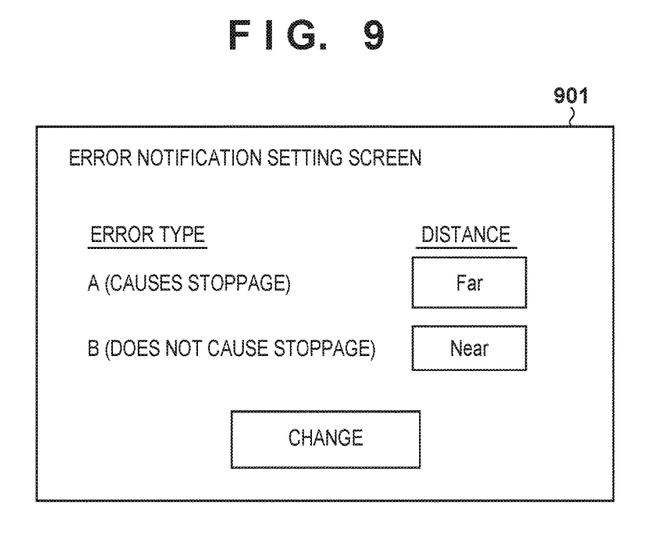
FIG. 9 is a figure illustrating an example of a configuration of a setting screen of an error notification range according to an embodiment of the present application invention.

FIG. 9 is one example of the setting screen 901 for error notification ranges according to the present embodiment. The error notification range setting screen 901 is displayed to the display unit 311 of the MFP 200. Note, configuration may be taken so as to display it to the display unit 358 of the mobile terminal 30. The user can set the range over which a notification will be performed for each type of error via the setting screen 901. Here, an example in which errors are classified based on whether or not the error causes the operation of the apparatus to stop is illustrated. An error that causes the operation of the apparatus to stop is defined as error A and an error that does not cause the operation of the apparatus to stop is defined as error B, and these are set to Far and Near respectively. The user can change the notification ranges to arbitrary ranges by the setting screen 901. Note, it is possible to limit the notification range to the Near range by a user setting for cases when an error causes the apparatus to stop as well. Note, the output radio wave intensity is set in accordance with the notification range set here.

Note, an example of a setting screen for setting the notification range by classifying into two groups is illustrated in the example of FIG. 9. Limitation is not made to this, and configuration may be taken such that the notification range can be set for each specific error, and configuration may be taken such that the user can set the notification range for each group (each plurality of errors) by setting groups for classifying errors. Here, although the two ranges of Far and Near can be set as the notification ranges, configuration may be taken such that more gradual ranges than described above can be set in the setting screen. Also, configuration may be taken such that it is possible to set a notification transmission interval or a number of notifications, and configuration may be taken such that it is possible to set an operation (such as a re-notification for example) for a case when an error is not cancelled after an Advertising Packet is sent. Also, although the notification range can be set in the example illustrated in FIG. 9, configuration may be taken such that the output radio wave intensity can be set.

Also, configuration may be taken such that the notification range is switched in accordance with detection information of the sensor 401 that the BLE unit 317 has. For example, when an error for which Near was set as the notification range occurs, the notification range may controlled such that it switches to a wider range in a case when it is clear that a person is not in the Near range according to the detection result of the sensor 401.

Figure 11:
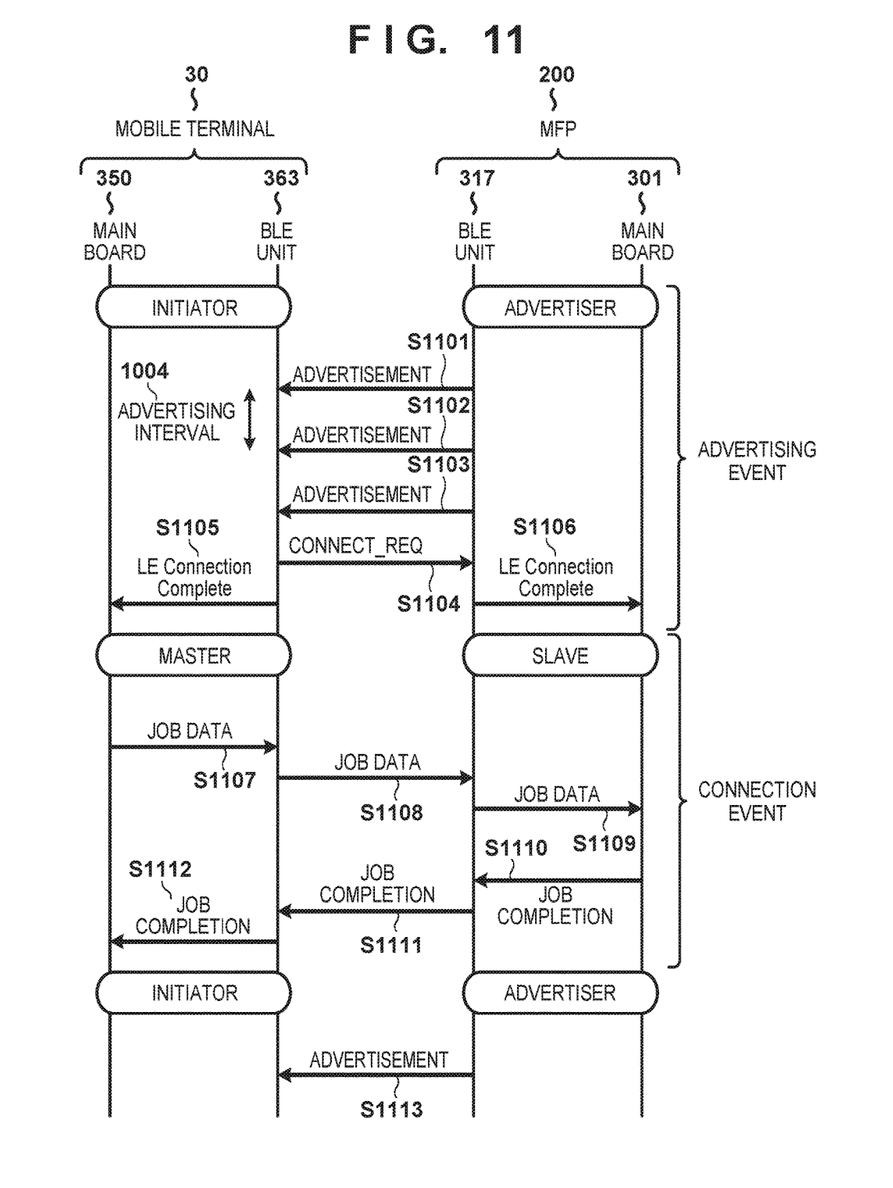
FIG. 11 is a view illustrating a processing sequence between a mobile terminal and an MFP.

Here, description is given using FIG. 11 regarding a flow in which the mobile terminal 30 executes print processing to the MFP 200 when an error has not occurred or after an error is resolved. FIG. 11 is a view for illustrating a processing sequence between the mobile terminal 30 and the MFP 200 from advertising to job reception to job completion.

In FIG. 11, the mobile terminal 30 is an initiator that awaits an advertisement packet from an advertiser that is in the periphery. Here, the MFP 200 is an advertiser that executes an advertising event of sending an advertisement packet in the advertising interval 1004 as illustrated in FIG. 10. Here, a set of Tx 1008 and Rx 1009 illustrated in FIG. 10 correspond to an advertisement (step S1101 to step S1103). The mobile terminal 30 can identify the capabilities or an error state of the MFP 200 by the mobile terminal 30 receiving an advertisement packet from the MFP 200. Note, in a case when the apparatus state changes, the radio wave intensity increases stepwise until the MFP 200 receives a connection request as described above.

If there is an MFP 200 that is suitable for executing a job, the mobile terminal 30 sends CONNECT REQ which is a request for transitioning to a connection event for making a network connection (step S1104). When the MFP 200 receives CONNECT REQ, it makes preparations to transition to the connection event. By the BLE unit 317 and the BLE unit 363 notifying LE Connection Complete to the main board 301 and the main board 350 respectively, the mobile terminal 30 and the MFP 200 change to master and slave respectively (step S1105 and step S1106).

After transitioning to the connection event, the slave MFP 200 establishes a connection with the mobile terminal 30 which is the master. Note that in the BLE standard, the master can form a "1: many" star-type topology with slaves.

The MFP 200, after changing to slave, does not broadcast advertisement packets to the mobile terminal 30. For this reason, mobile terminals in the surroundings other than the mobile terminal 30 that established the connection with the MFP 200 cannot identify information regarding the MFP 200 through advertisement. In contrast to this, in the present embodiment, the mobile terminal 30, by receiving an advertisement packet, can identify an error state of the MFP 200 prior to establishing a connection with the MFP 200.

In the mobile terminal 30, the main board 350 sends job data of a print job to the BLE unit 363 (step S1107). For the job data here, a print job main body in which image data is embedded may be sent and information of a pointer to a print job may be notified. In the mobile terminal 30, the BLE unit 363 sends job data of a print job to the BLE unit 317 (step S1108). Note, in the present embodiment, if pointer information (job information) is sent, job data of the print job is sent to the BLE unit 317 thereafter, but limitation is not made to this. Configuration may be taken such that the print job main body is sent by communication means other than BLE, and configuration may be taken such that, for example, it is sent using the WLAN unit 361 which can communicate in a wider range than BLE. In the present embodiment, the print job main body or pointer information are sent as information relating to the job.

In the MFP 200, the BLE unit 317 sends to the main board 301 received job data (step S1109). The main board 301 notifies job completion to the BLE unit 317 when it receives the job data (step S1110). The timing of notification of job completion may be after the operation of the job completes, or may be the timing at which the reception of job data finishes, or may be the timing at which the pointer to the job is notified. Note that if a pointer to a job is notified, for example, the actual data of the job may be obtained using the WLAN unit 316.

In the MFP 200, the BLE unit 317 notifies the received job completion to the BLE unit 363 of the mobile terminal 30 (step S1111). The BLE unit 363 notifies the received job completion to the main board 350 (step S1112).

After that, the mobile terminal 30 and the MFP 200 respectively return to initiator and advertiser, and the MFP 200 resumes advertising (step S1113).

In the above described present embodiment, it is possible to control a notification range depending on error contents and perform an error notification appropriately within that range. As a result, because an error notification will not reach an unnecessary range, a client for whom an error notification is unnecessarily receiving the error notification is prevented.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-131033, filed Jun. 30, 2016, which is hereby incorporated by reference herein in its entirety.

What is claimed is:

1. A communication apparatus capable of wireless communication with an external apparatus, the communication apparatus, comprising:
   at least one processor, and
   at least one memory storing a program which is executed by the at least one processor to cause the communication apparatus to function as:
   a broadcast unit configured to broadcast an advertisement signal prior to establishing a connection by wireless communication with the external apparatus;
   a setting unit configured to set an output radio wave intensity for which an advertisement signal is output by the broadcast unit for a type of error which occurs in the communication apparatus; and
   a determination unit configured to determine a type of error that occurred in the communication apparatus, wherein
   when an error occurs in the communication apparatus, the determination unit determines the type of error that occurred and the broadcast unit broadcasts, at an output radio wave intensity set for the type of error by the setting unit, an advertisement signal that includes information indicating that the error occurred.

2. The communication apparatus according to claim 1, wherein the wireless communication is communication using BLE (Bluetooth Low Energy).

3. The communication apparatus according to claim 1, wherein errors that occur in the communication apparatus are classified into a plurality of groups and an output radio wave intensity is set for each group.

4. The communication apparatus according to claim 1, wherein a degree of importance is set for errors that occur in the communication apparatus and an output radio wave intensity is set in accordance with the degree of importance.

5. The communication apparatus according to claim 1, wherein the output radio wave intensity is set based on whether or not an error that occurred in the communication apparatus is an error that causes operation of the communication apparatus to stop.

6. The communication apparatus according to claim 1, wherein the output radio wave intensity differs depending on the type of the error.

7. The communication apparatus according to claim 1, wherein the setting unit further accepts a setting of a range over which an error notification is transmitted for an error that occurs in the communication apparatus.

8. The communication apparatus according to claim 1, wherein the communication apparatus is an image forming apparatus.

9. The communication apparatus according to claim 1, wherein the setting unit sets a first output radio wave intensity for an error of a first type, and sets a second output radio wave intensity different from the first output radio wave intensity for an error of a second type different from the error of the first type.

10. The communication apparatus according to claim 1, wherein the broadcast unit broadcasts, in response to the error not being resolved, the advertisement signal again using a condition which is set for the error and is different from the output radio wave intensity.

11. A method of controlling a communication apparatus capable of wireless communication with an external apparatus, the method comprising:
   broadcasting an advertisement signal prior to establishing a connection by wireless communication with the external apparatus;
   setting an output radio wave intensity for which an advertisement signal is output by the broadcast unit for a type of error which occurs in the communication apparatus; and
   determining a type of error that occurred in the communication apparatus, wherein
   when an error occurs in the communication apparatus, the type of error that occurred in the communication apparatus is determined and an advertisement signal that includes information indicating that the error occurred is broadcasted at an output radio wave intensity set for the type of error in the setting step.

12. A non-transitory computer-readable storage medium storing a program that causes a computer to
   broadcast an advertisement signal prior to establishing a connection by wireless communication with an external apparatus;
   set an output radio wave intensity for which an advertisement signal is output by the broadcast unit for a type of error which occurs in the computer; and
   determine a type of error that occurred in the computer, wherein
   when an error occurs in the computer, the type of error that occurred in the computer is determined and an advertisement signal that includes information indicating that the error occurred is broadcasted at an output radio wave intensity set for the type of error.

* * * * *